US010719259B2

(12) United States Patent
Hu et al.

(10) Patent No.: US 10,719,259 B2
(45) Date of Patent: Jul. 21, 2020

(54) MEMORY MANAGEMENT METHOD, MEMORY STORAGE DEVICE AND MEMORY CONTROL CIRCUIT UNIT

(71) Applicant: PHISON ELECTRONICS CORP., Miaoli (TW)

(72) Inventors: Chun-Yang Hu, Taoyuan (TW); Cheng-Yi Lin, New Taipei (TW); Bo-Cheng Ko, Miaoli County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 15/940,991

(22) Filed: Mar. 30, 2018

(65) Prior Publication Data

US 2019/0227731 A1 Jul. 25, 2019

(30) Foreign Application Priority Data

Jan. 19, 2018 (TW) .............................. 107102129 A

(51) Int. Cl.
*G06F 3/06* (2006.01)
*G06F 12/10* (2016.01)
*G06F 7/08* (2006.01)

(52) U.S. Cl.
CPC ............ *G06F 3/0652* (2013.01); *G06F 3/061* (2013.01); *G06F 3/064* (2013.01); *G06F 3/0604* (2013.01); *G06F 3/065* (2013.01); *G06F 3/0608* (2013.01); *G06F 3/0679* (2013.01); *G06F 7/08* (2013.01); *G06F 12/10* (2013.01); *G06F 2212/1044* (2013.01); *G06F 2212/657* (2013.01)

(58) Field of Classification Search
CPC ...... G06F 3/0652; G06F 3/0604; G06F 3/065; G06F 7/08; G06F 12/10; G06F 2212/1044; G06F 2212/657; G06F 2212/7205
See application file for complete search history.

(56) References Cited

U.S. PATENT DOCUMENTS

2018/0307417 A1* 10/2018 Dubeyko .............. G06F 12/023

OTHER PUBLICATIONS

Jung et al "Garbage Collection for Low Performance Variation in NAND Flash Storage Systems" [online] Published Nov. 12, 2014 [retrieved on Feb. 8, 2019]. Retrieved from the Internet <URL: https://ieeexplore.ieee.org/document/6954423?source=IQplus > (Year: 2014).*

(Continued)

*Primary Examiner* — David Yi
*Assistant Examiner* — Dustin B. Fulford
(74) *Attorney, Agent, or Firm* — JCIPRNET

(57) ABSTRACT

A memory management method for a rewritable non-volatile memory module is provided according to an exemplary embodiment of the disclosure. The memory management method includes: recording sorting information corresponding to a plurality of first physical units of the rewritable non-volatile memory module according to a data storage status of the first physical units; receiving at least one command, and the command is configured to change the data storage status of the first physical units; updating the sorting information according to the command; and copying data stored in at least one physical unit among the first physical units to at least one second physical unit of the rewritable non-volatile memory module according to the updated sorting information.

21 Claims, 9 Drawing Sheets

(56) References Cited

OTHER PUBLICATIONS

Jung et al "Garbage Collection for Low Performance Variation in NAND Flash Storage Systems" [online] Published Nov. 12, 2014 [retrieved on Feb. 8, 2019]. Retrieved from the Internet https://ieeexplore.ieee.org/document/6954423?source="IQplus" (Year: 2014).*

* cited by examiner

MEMORY MANAGEMENT METHOD, MEMORY STORAGE DEVICE AND MEMORY CONTROL CIRCUIT UNIT

CROSS-REFERENCE TO RELATED APPLICATION

This application claims the priority benefit of Taiwan application serial no. 107102129, filed on Jan. 19, 2018. The entirety of the above-mentioned patent application is hereby incorporated by reference herein and made a part of this specification.

BACKGROUND

Technical Field

The invention relates to a memory management technique, and more particularly, to a memory management method, a memory storage device and a memory control circuit unit.

Description of Related Art

The markets of digital cameras, cellular phones, and MP3 players have expanded rapidly in recent years, resulting in escalated demand for storage media by consumers. The characteristics of data non-volatility, low power consumption, and compact size make a rewritable non-volatile memory module (e.g., flash memory) ideal to be built in the portable multi-media devices as cited above.

After a memory storage device has been used for a period of time, a storage location of data in the memory storage device will become quite random so the number of spare physical blocks in the memory storage device is reduced. Under this situation, procedures such as a garbage collection or the like may be used to arrange the data stored in the memory storage device in order to release new spare physical blocks. In general, when the garbage collection procedure is to be performed, physical blocks in the memory storage device are sorted according to a data volume of valid data stored in the physical blocks. Accordingly, performance of the garbage collection procedure may be improved by performing the garbage collection for the physical blocks stored with less valid data in the garbage collection procedure. Alternatively, in certain configurations, physical blocks are sorted after the garbage collection procedure is performed a predetermined number of times.

However, in the example above, if a sorting for the physical blocks is performed each time when the garbage collection procedure is performed, the sorting may be meaningless sometimes (because sorting results may be identical) but simply wasting system resources. In addition, if the sorting for the physical blocks is only triggered after the garbage collection procedure is performed the predetermined number of times, performance of the garbage collection procedure may be reduced sometimes because the physical blocks have not been sorted.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The invention provides a memory management method, a memory storage device and a memory control circuit unit, which are capable of dynamically determining whether to update sorting information corresponding to physical units in order to improve performance of a data merging operation.

An exemplary embodiment of the invention provides a memory management method for a rewritable non-volatile memory module. The rewritable non-volatile memory module includes a plurality of physical units. The memory management method includes the following steps. Sorting information corresponding to a plurality of first physical units among the physical units is recorded according to a data storage status of the first physical units. At least one command is received, wherein the command is configured to change the data storage status of the first physical units. The sorting information is updated according to the command. Data stored in at least one physical unit among the first physical units is copied to at least one second physical unit among the physical units according to the updated sorting information.

Another exemplary embodiment of the invention provides a memory storage device, which includes a connection interface unit, a rewritable non-volatile memory module and a memory control circuit unit. The connection interface unit is configured to couple to a host system. The rewritable non-volatile memory module includes a plurality of physical units. The memory control circuit unit is coupled to the connection interface unit and the rewritable non-volatile memory module. The memory control circuit unit is configured to record sorting information corresponding to a plurality of first physical units among the physical units according to a data storage status of the first physical units. The memory control circuit unit is further configured to receive at least one command, and the at least one command is configured to change the data storage status of the first physical units. The memory control circuit unit is further configured to update the sorting information according to the at least one command. The memory control circuit unit is further configured to copy data stored in at least one physical unit among the first physical units to at least one second physical unit among the physical units according to the updated sorting information.

Another exemplary embodiment of the invention provides a memory control circuit unit, which is configured to control a memory storage device. The memory control circuit unit includes a host interface, a memory interface and a memory management circuit. The host interface is configured to couple to a host system. The memory interface is configured to couple to the rewritable non-volatile memory module, wherein the rewritable non-volatile memory module includes a plurality of physical units. The memory management circuit is coupled to the host interface and the memory interface. The memory management circuit is configured to record sorting information corresponding to a plurality of first physical units among the physical units according to a data storage status of the first physical units. The memory management circuit is further configured to receive at least one command, and the at least one command is configured to change the data storage status of the first physical units. The memory management circuit is further configured to update the sorting information according to the at least one command. The memory management circuit is further configured to copy data stored in at least one physical unit among the first physical units to at least one second physical unit among the physical units according to the updated sorting information.

Based on the above, after the command capable of changing the data storage status of the first physical units is received, the sorting information corresponding to the first physical units may be updated. The updated sorting information may be used to copy the data stored in at least one of the first physical units to at least one second physical unit. By dynamically determining whether to update the sorting information corresponding to the physical units, performance of the data merging operation may be improved.

To make the above features and advantages of the disclosure more comprehensible, several embodiments accompanied with drawings are described in detail as follows.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
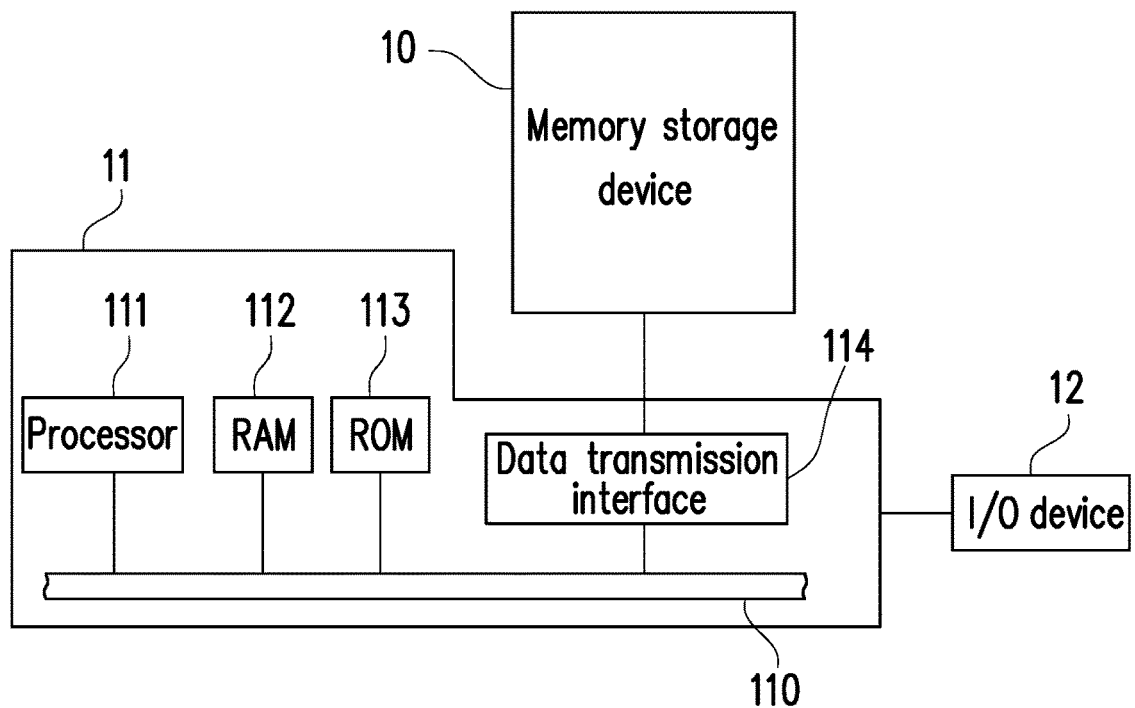
FIG. 1 is a schematic diagram illustrating a host system, a memory storage device and an I/O (input/output) device according to an exemplary embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

In general, a memory storage device (a.k.a. a memory storage system) includes a rewritable non-volatile memory module and a controller (a.k.a. a control circuit). The memory storage device usually operates together with a host system so the host system can write data into the memory storage device or read data from the memory storage device.

Figure 2:
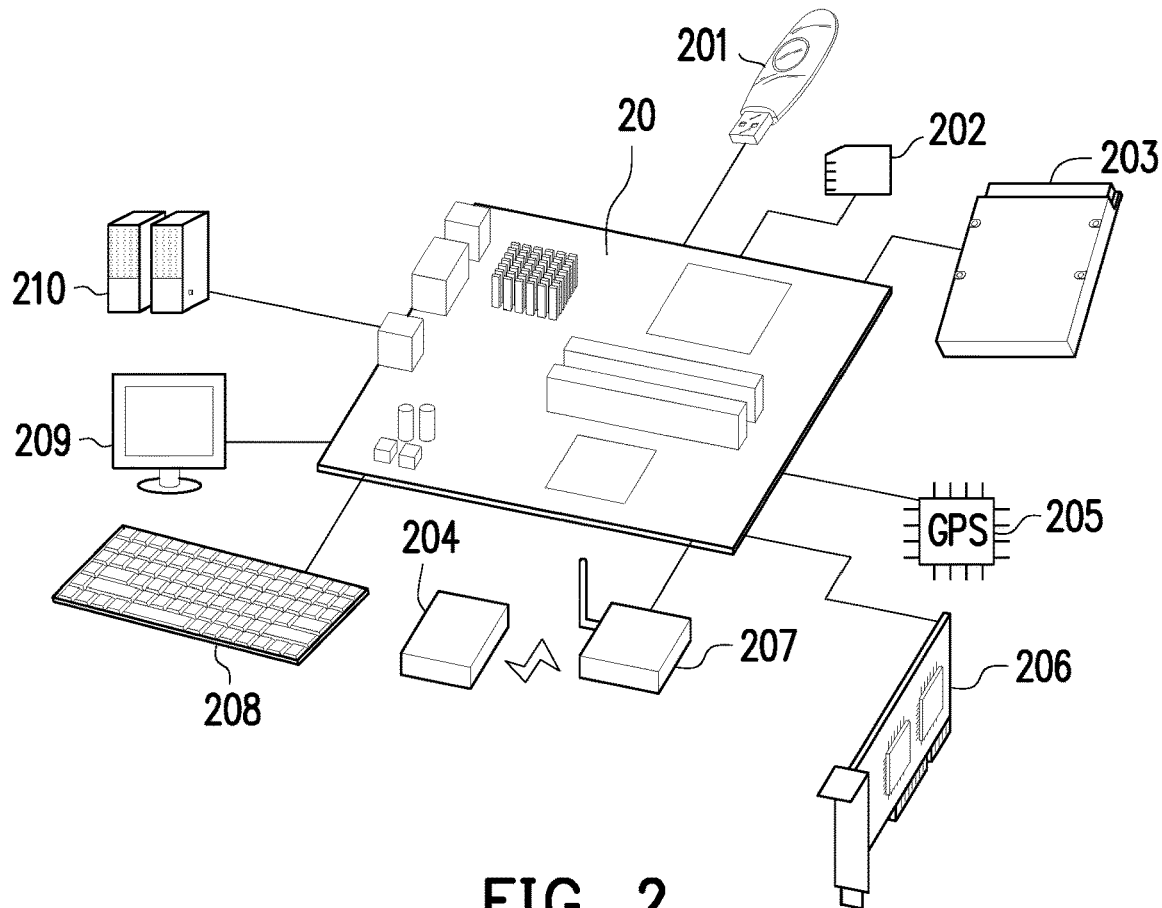
FIG. 2 is a schematic diagram illustrating a host system, a memory storage device and an I/O device according to another exemplary embodiment of the invention.

FIG. 1 is a schematic diagram illustrating a host system, a memory storage device and an I/O (input/output) device according to an exemplary embodiment of the invention. FIG. 2 is a schematic diagram illustrating a host system, a memory storage device and an I/O device according to another exemplary embodiment of the invention.

Referring to FIG. 1 and FIG. 2, a host system 11 generally includes a processor 111, a RAM (random access memory) 112, a ROM (read only memory) 113 and a data transmission interface 114. The processor 111, the RAM 112, the ROM 113 and the data transmission interface 114 are coupled to a system bus 110.

In the present exemplary embodiment, the host system 11 is coupled to a memory storage device 10 through the data transmission interface 114. For example, the host system 11 can store data into the memory storage device 10 or read data from the memory storage device 10 through the data transmission interface 114. Further, the host system 11 is coupled to an I/O device 12 via the system bus 110. For example, the host system 11 can transmit output signals to the I/O device 12 or receive input signals from the I/O device 12 via the system bus 110.

In the present exemplary embodiment, the processor 111, the RAM 112, the ROM 113 and the data transmission interface 114 may be disposed on a main board 20 of the host system 11. The number of the data transmission interface 114 may be one or more. Through the data transmission interface 114, the main board 20 may be coupled to the memory storage device 10 in a wired manner or a wireless manner. The memory storage device 10 may be, for example, a flash drive 201, a memory card 202, a SSD (Solid State Drive) 203 or a wireless memory storage device 204. The wireless memory storage device 204 may be, for example, a memory storage device based on various wireless communication technologies, such as a NFC (Near Field Communication) memory storage device, a WiFi (Wireless Fidelity) memory storage device, a Bluetooth memory storage device, a BLE (Bluetooth low energy) memory storage device (e.g., iBeacon). Further, the main board 20 may also be coupled to various I/O devices including a GPS (Global Positioning System) module 205, a network interface card 206, a wireless transmission device 207, a keyboard 208, a monitor 209 and a speaker 210 through the system bus 110. For example, in an exemplary embodiment, the main board 20 can access the wireless memory storage device 204 via the wireless transmission device 207.

Figure 3:
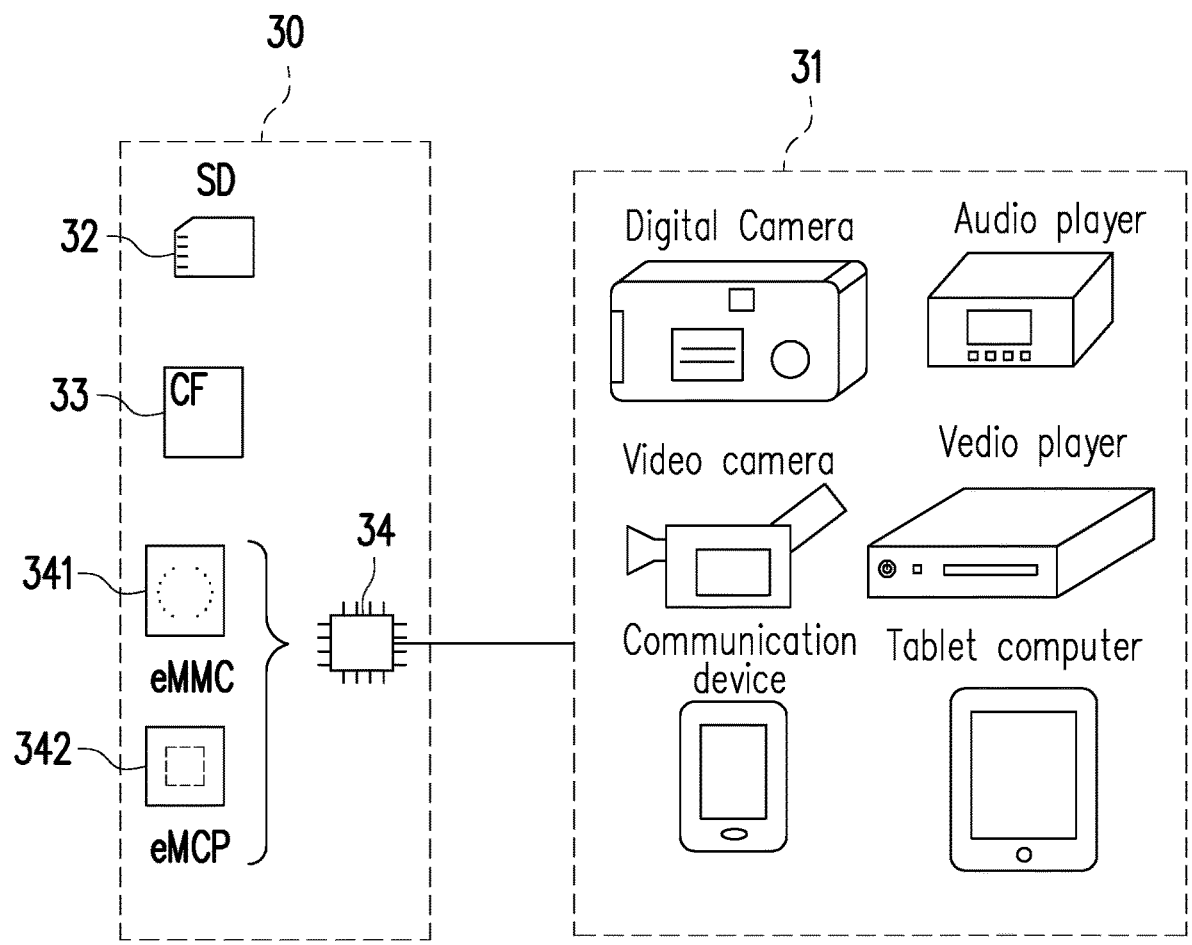
FIG. 3 is a schematic diagram illustrating a host system and a memory storage device according to another exemplary embodiment of the invention.

In an exemplary embodiment, aforementioned host system may be any system capable of substantially cooperating with the memory storage device for storing data. Although the host system is illustrated as a computer system in foregoing exemplary embodiment, nonetheless, FIG. 3 is a schematic diagram illustrating a host system and a memory storage device according to another exemplary embodiment of the invention. Referring to FIG. 3, in another exemplary embodiment, a host system 31 may also be a system such as a digital camera, a video camera, a communication device, an audio player, a video player or a tablet computer, whereas a memory storage device 30 may be various non-volatile memory storage devices used by the host system 31, such as a SD (Secure Digital) card 32, a CF (Compact Flash) card 33 or an embedded storage device 34. The embedded storage device 34 includes various embedded storage devices capable of directly coupling a memory module onto a substrate of the host system, such as an eMMC (embedded Multi Media Card) 341 and/or an eMCP (embedded Multi Chip Package) storage device 342.

Figure 4:
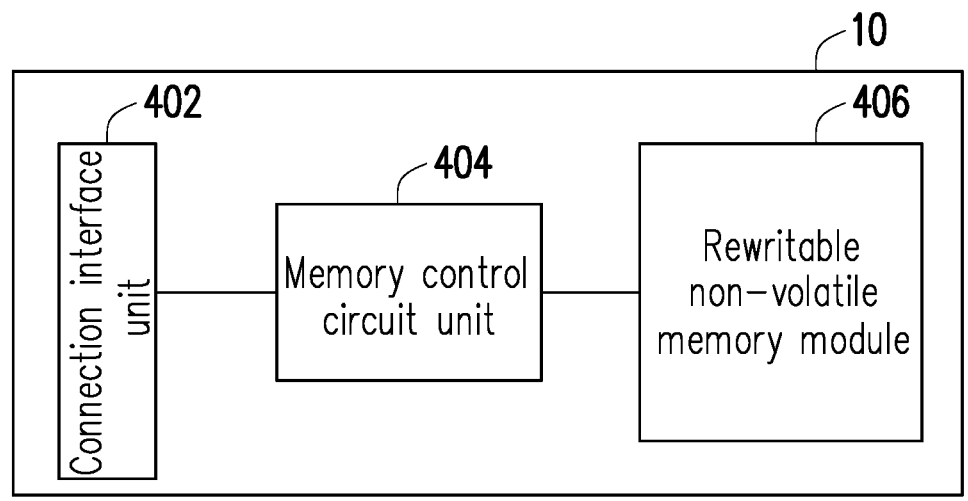
FIG. 4 is a schematic block diagram illustrating a memory storage device according to an exemplary embodiment of the invention.

FIG. 4 is a schematic block diagram illustrating a memory storage device according to an exemplary embodiment of the invention.

Referring to FIG. 4, the memory storage device 10 includes a connection interface unit 402, a memory control circuit unit 404 and a rewritable non-volatile memory module 406.

The connection interface unit 402 is configured to couple the memory storage device 10 to the host system 11. In the present exemplary embodiment, the connection interface unit 402 is compatible with a SATA (Serial Advanced Technology Attachment) standard. Nevertheless, it should be understood that the invention is not limited to the above. The connection interface unit 402 may also be compatible with a PATA (Parallel Advanced Technology Attachment) standard, an IEEE (Institute of Electrical and Electronic Engineers) 1394 standard, a PCI Express (Peripheral Component Interconnect Express) interface standard, a USB (Universal Serial Bus) standard, a SD interface standard, a UHS-I (Ultra High Speed-I) interface standard, a UHS-II (Ultra High Speed-II) interface standard, a MS (Memory Stick) interface standard, a MCP interface standard, a MMC interface standard, an eMMC interface standard, a UFS (Universal Flash Storage) interface standard, an eMCP interface standard, a CF interface standard, an IDE (Integrated Device Electronics) interface standard or other suitable standards. The connection interface unit 402 and the memory control circuit unit 404 may be packaged into one chip, or the connection interface unit 402 may be distributed outside of a chip containing the memory control circuit unit 404.

The memory control circuit unit 404 is configured to execute a plurality of logic gates or control commands which are implemented in a hardware form or in a firmware form and perform operations, such as writing, reading or erasing data in the rewritable non-volatile memory module 406 according to the commands of the host system 11.

The rewritable non-volatile memory module 406 is coupled to the memory control circuit unit 404 and configured to store data written from the host system 11. The rewritable non-volatile memory module 406 may be a SLC (Single Level Cell) NAND flash memory module (i.e., a flash memory module capable of storing one bit in one memory cell), a MLC (Multi Level Cell) NAND flash memory module (i.e., a flash memory module capable of storing two bits in one memory cell), a TLC (Triple Level Cell) NAND flash memory module (i.e., a flash memory module capable of storing three bits in one memory cell), other flash memory modules or any memory module having the same features.

In the rewritable non-volatile memory module 406, one or more bits are stored by changing a voltage (hereinafter, also known as a threshold voltage) of each of the memory cells. More specifically, in each of the memory cells, a charge trapping layer is provided between a control gate and a channel. Amount of electrons in the charge trapping layer may be changed by applying a write voltage to the control gate thereby changing the threshold voltage of the memory cell. This operation of changing the threshold voltage of the memory cell is also known as "writing data into the memory cell" or "programming the memory cell". By changing the threshold voltage, each of the memory cells in the rewritable non-volatile memory module 406 can have a plurality of storage states. The storage state to which the memory cell belongs may be determined by applying a read voltage to the memory cell, so as to obtain the one or more bits stored in the memory cell.

In the present exemplary embodiment, the memory cells of the rewritable non-volatile memory module 406 constitute a plurality of physical programming units, and the physical programming units constitute a plurality of physical erasing units. Specifically, the memory cells on the same word line constitute one or more of the physical programming units. If each of the memory cells can store two or more bits, the physical programming units on the same word line can be at least classified into a lower physical programming unit and an upper physical programming unit. For instance, a least significant bit (LSB) of one memory cell belongs to the lower physical programming unit, and a most significant bit (MSB) of one memory cell belongs to the upper physical programming unit. In general, in the MLC NAND flash memory, a writing speed of the lower physical programming unit is higher than a writing speed of the upper physical programming unit, and/or a reliability of the lower physical programming unit is higher than a reliability of the upper physical programming unit.

In the present exemplary embodiment, the physical programming unit is the minimum unit for programming. That is, the physical programming unit is the minimum unit for writing data. For example, the physical programming unit is a physical page or a physical sector. If the physical programming unit is the physical page, these physical programming units usually include a data bit area and a redundancy bit area. The data bit area includes multiple physical sectors configured to store user data, and the redundant bit area is configured to store system data (e.g., management data such as an error correcting code, etc.). In the present exemplary embodiment, the data bit area includes 32 physical sectors, and a size of each physical sector is 512 bytes (B). However, in other exemplary embodiments, the data bit area may also include 8, 16 physical sectors or different number (more or less) of the physical sectors, and the size of each physical sector may also be greater or smaller. On the other hand, the physical erasing unit is the minimum unit for erasing. Namely, each physical erasing unit contains the least number of memory cells to be erased together. For instance, the physical erasing unit is a physical block.

Figure 5:
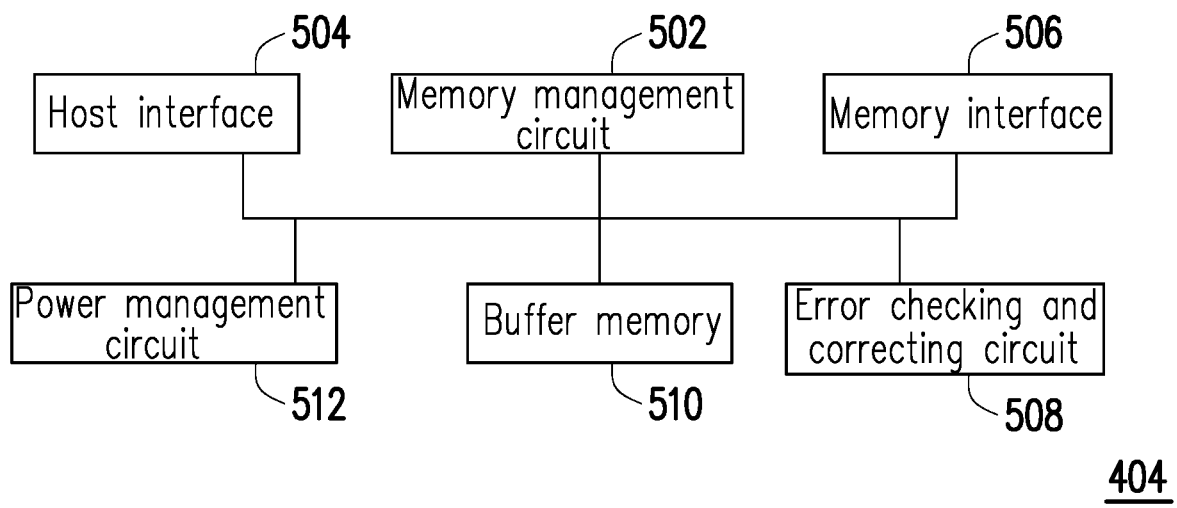
FIG. 5 is a schematic block diagram illustrating a memory control circuit unit according to an exemplary embodiment of the invention.

FIG. 5 is a schematic block diagram illustrating a memory control circuit unit according to an exemplary embodiment of the invention.

Referring to FIG. 5, the memory control circuit unit 404 includes a memory management circuit 502, a host interface 504 and a memory interface 506.

The memory management circuit 502 is configured to control overall operations of the memory control circuit unit 404. Specifically, the memory management circuit 502 has a plurality of control commands. When the memory storage device 10 operates, the control commands are executed to perform various operations such as data writing, data reading and data erasing. Hereinafter, operations of the memory management circuit 502 are described as equivalent to operations of the memory control circuit unit 404.

In the present exemplary embodiment, the control commands of the memory management circuit 502 are implemented in form of firmware. For example, the memory management circuit 502 has a microprocessor unit (not illustrated) and a ROM (not illustrated), and the control commands are burned into the ROM. When the memory storage device 10 operates, the control commands are executed by the microprocessor to perform operations of writing, reading or erasing data.

In another exemplary embodiment, the control commands of the memory management circuit 502 may also be stored as program codes in a specific area (for example, the system area in a memory exclusively used for storing system data) of the rewritable non-volatile memory module 406. In addition, the memory management circuit 502 has a microprocessor unit (not illustrated), the read only memory (not illustrated) and a random access memory (not illustrated). More particularly, the ROM has a boot code, which is executed by the microprocessor unit to load the control commands stored in the rewritable non-volatile memory module 406 to the RAM of the memory management circuit 502 when the memory control circuit unit 404 is enabled. Then, the control commands are executed by the microprocessor unit to perform operations, such as writing, reading or erasing data.

Further, in another exemplary embodiment, the control commands of the memory management circuit 502 may also be implemented in form of hardware. For example, the memory management circuit 502 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory cell management circuit is configured to manage the memory cells of the rewritable non-volatile memory module 406 or a group thereof. The memory writing circuit is configured to give a write command sequence for the rewritable non-volatile memory module 406 in order to write data into the rewritable non-volatile memory module 406. The memory reading circuit is configured to give a read command sequence for the rewritable non-volatile memory module 406 in order to read data from the rewritable non-volatile memory module 406. The memory erasing circuit is configured to give an erase command sequence for the rewritable non-volatile memory module 406 in order to erase data from the rewritable non-volatile memory module 406. The data processing circuit is configured to process both the data to be written into the rewritable non-volatile memory module 406 and the data read from the rewritable non-volatile memory module 406. Each of the write command sequence, the read command sequence and the erase command sequence may include one or more program codes or command codes, and instruct the rewritable non-volatile memory module 406 to perform the corresponding operations, such as writing, reading and erasing. In an exemplary embodiment, the memory management circuit 502 may further give command sequence of other types to the rewritable non-volatile memory module 406 for instructing to perform the corresponding operations.

The host interface 504 is coupled to the memory management circuit 502 and configured to receive and identify commands and data sent from the host system 11. In other words, the commands and data transmitted by the host system 11 are transmitted to the memory management circuit 502 via the host interface 504. In the present exemplary embodiment, the host interface 504 is compatible with the SATA standard. Nevertheless, it should be understood that the invention is not limited to the above. The host interface 504 may also compatible with the PATA standard, the IEEE 1394 standard, the PCI Express standard, the USB standard, the SD standard, the UHS-I standard, the UHS-II standard, the MS standard, the MMC standard, the eMMC standard, the UFS standard, the CF standard, the IDE standard, or other suitable standards for data transmission.

The memory interface 506 is coupled to the memory management circuit 502 and configured to access the rewritable non-volatile memory module 406. In other words, data to be written into the rewritable non-volatile memory module 406 is converted into a format acceptable by the rewritable non-volatile memory module 406 via the memory interface 506. Specifically, if the memory management circuit 502 intends to access the rewritable non-volatile memory module 406, the memory interface 506 will send the corresponding command sequence. For example, the command sequences may include the write command sequence as an instruction for writing data, the read command sequence as an instruction for reading data, the erase command sequence as an instruction for erasing data, and other corresponding command sequences as instructions for performing various memory operations (e.g., changing read voltage levels or performing a garbage collection procedure). These command sequences are generated by the memory management circuit 502 and transmitted to the rewritable non-volatile memory module 406 through the memory interface 506, for example. The command sequences may include one or more signals, or data transmitted in the bus. The signals or the data may include command codes and program codes. For example, information such as identification codes and memory addresses are included in the read command sequence.

In an exemplary embodiment, the memory control circuit unit 404 further includes an error checking and correcting circuit 508, a buffer memory 510 and a power management circuit 512.

The error checking and correcting circuit 508 is coupled to the memory management circuit 502 and configured to perform an error checking and correcting operation to ensure the correctness of data. Specifically, when the memory management circuit 502 receives a write command from the host system 11, the error checking and correcting circuit 508 generates an ECC (error correcting code) and/or an EDC (error detecting code) for data corresponding to the write command, and the memory management circuit 502 writes data corresponding to the write command and the corresponding ECC and/or the EDC into the rewritable non-volatile memory module 406. Then, when the memory management circuit 502 reads the data from the rewritable non-volatile memory module 406, the corresponding ECC and/or the EDC are also read, and the error checking and correcting circuit 508 performs the error checking and correcting operation on the read data based on the ECC and/or the EDC.

The buffer memory 510 is coupled to the memory management circuit 502 and configured to temporarily store data and commands from the host system 11 or data from the rewritable non-volatile memory module 406. The power management unit 512 is coupled to the memory management circuit 502 and configured to control a power of the memory storage device 10.

Figure 6:
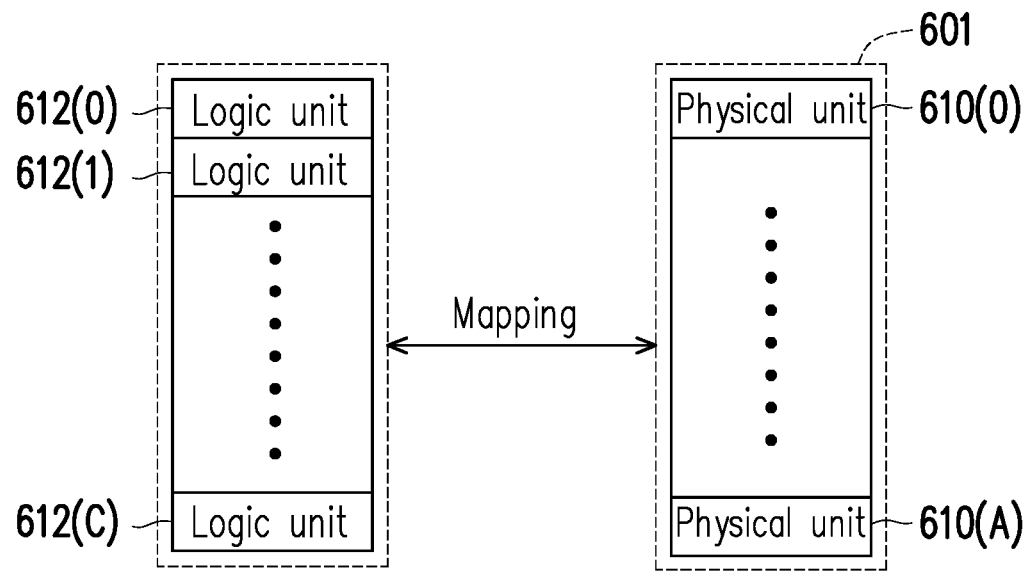
FIG. 6 is a schematic diagram illustrating management of a rewritable non-volatile memory module according to an exemplary embodiment of the invention.
Figure 6:
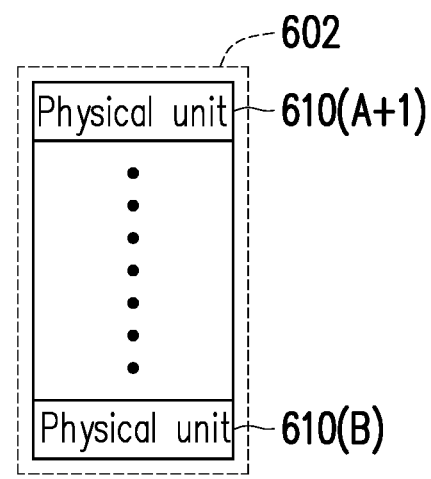

FIG. 6 is a schematic diagram illustrating management of a rewritable non-volatile memory module according to an exemplary embodiment of the invention.

With reference to FIG. 6, the memory management circuit 502 logically groups physical units 610(0) to 610(B) of the rewritable non-volatile memory module 406 into a storage area 601 and a spare area 602. The physical units 610(0) to 610(A) in the storage area 601 are stored with data. For example, data stored in the storage area 601 includes valid data and invalid data. The physical units 610(A+1) to 610(B) in the spare area 602 are not yet used for storing data. When data is to be stored, the memory management circuit 502 selects one physical unit from the physical units 610(A+1) to 610(B) in the spare area 602 and stores data from the host system 11 or from other physical units in the storage area 601 into the selected physical unit. Meanwhile, the selected physical unit is then associated with the storage area 601. In addition, after one physical unit in the storage area 601 is erased, that erased physical unit is then re-associated with the spare area 602.

In the present exemplary embodiment, each physical unit belonging to the spare area 602 is also known as a spare physical unit, and each physical unit belonging to the storage area 601 is also known as a non-spare physical unit. In the present exemplary embodiment, one physical unit refers to one physical erasing unit. However, in another exemplary embodiment, one physical unit may also include a plurality of physical erasing units.

The memory management circuit 502 assigns logical units 612(0) to 612(C) to be mapped to the physical units 610(0) to 610(A) in the storage area 601. In the present exemplary embodiment, each logical unit refers to one logical address. However, in another exemplary embodiment, each logical unit may also refer to one logical programming unit, one logical erasing unit or a composition of a plurality of continuous or discontinuous logical addresses. In addition, each of the logical units 612(0) to 612(C) may also be mapped to one or more physical units.

The memory management circuit 502 records a mapping relation between the logical units and the physical units (a.k.a. a logical-physical address mapping relation) into at least one logical-physical mapping table. When the host system 11 intends to read the data from the memory storage device 10 or write the data into the memory storage device 10, the memory management circuit 502 may perform a data accessing operation on the memory storage device 10 according to the logical-physical mapping table.

It is noted that in the following description, some terms may be replaced with corresponding abbreviations for ease of reading (see Table 1).

| rewritable non-volatile memory module | RNVM module |
|---|---|
| memory management circuit | MMC |
| physical unit | PU |
| logical unit | LU |

In the present exemplary embodiment, the valid data is latest data belonging to one LU, and the invalid data is not data belonging to any LU. For example, if the host system 11 stores new data into one LU to overwrite old data originally stored in that LU (i.e., update data belonging to that LU), this new data stored in the storage area 601 is the latest data belonging to that LU and marked as valid, whereas the old data being overwritten may still be stored in the storage area 601 but marked as invalid.

In the present exemplary embodiment, if data belonging to one LU is updated, a mapping relation between that LU and the PU stored with the old data belonging to that LU is removed, and a mapping relation between that LU and the PU stored with the latest data belonging to that LU is established. However, in another exemplary embodiment, if data belonging to one LU is updated, a mapping relation between that LU and the PU stored with the old data belonging to that LU may still be maintained.

When the memory storage device 10 leaves the factory, a total number of the PUs belonging to the spare area 602 is a predetermined number (e.g., 30). During operation of the memory storage device 10, there will be increasingly more PUs being selected from the spare area 602 and then associated with the storage area 601 for storing data (e.g., the user data from the host system 11). Accordingly, the total number of the PUs belonging to the spare area 602 is gradually reduced with use of the memory storage device 10 over time.

During operation of the memory storage device 10, the MMC 502 may continuously update the total number of the PUs belonging to the spare area 602. The MMC 502 may perform a data merging operation according to a number of the PUs in the spare area 602 (i.e., a total number of the spare PUs). For example, the MMC 502 may determine whether the total number of the PUs belonging to the spare area 602 is less than or equal to a threshold (a.k.a. a first threshold). The first threshold may be, for example, 2 or a greater value (e.g., 10), which is not particularly limited by the invention. If the total number of the PUs belonging to the spare area 602 is less than or equal to the first threshold, the MMC 502 may perform the data merging operation. In an exemplary embodiment, the data merging operation is also known as a garbage collection operation.

In the data merging operation, the MMC 502 may select at least one PU (a.k.a. a source node) from the storage area and try to collectively copy the valid data from the selected PU to another PU (a.k.a. a recycling node). The PU used for storing the copied valid data is selected from the spare area 602 and then associated with the storage area 601. After the valid data stored in a specific PU is completely copied to the recycling node, that specific PU may then be erased and associated with the spare area 602. In an exemplary embodiment, an operation of re-associating one PU from the storage area 601 back to the spare area 602 (or an operation of erasing one PU) is also known as releasing one spare PU. By performing the data merging operation, one or more spare PUs will be released so the total number of the PUs belonging to the spare area 602 can be gradually increased.

After the data merging operation is started, if the PUs belonging to the spare area 602 match a specific condition, the data merging operation is then stopped. For example, the MMC 502 may determine whether the total number of the PUs belonging to the spare area 602 is greater than or equal to one threshold (also referred to as a second threshold hereinafter). For example, the second threshold may be greater than the first threshold. If the total number of the PUs belonging to the spare area 602 is greater than or equal to the second threshold, the MMC 502 may stop the data merging operation. For example, "to stop the data merging operation" refers to end the data merging operation currently in process. After one data merging operation is stopped, if the total number of the PUs belonging to the spare area 602 is less than or equal to the first threshold again, the next data merging operation may be performed again to try to release the new PUs.

The MMC 502 records sorting information corresponding to a plurality of PUs in the storage area 601 (a.k.a. first PUs) according a data storage status of these PUs. The recorded sorting information may reflect status and/or distribution regarding a data volume of the valid data and/or the invalid data stored in the PUs. For example, the MMC 502 may determine the sorting information corresponding to the first PUs according to valid count information corresponding to the first PUs. For example, the valid count information corresponding to one PU may include one value (a.k.a. a valid count). One valid count is correlated to the data volume of the valid data or the invalid data stored in the corresponding PU. For example, one valid count may be positively correlated to the data volume of the valid data stored in the corresponding PU, and/or negatively correlated to the data volume of the invalid data stored in the corresponding PU. For example, if the valid count corresponding to one PU is increased, it means that the data volume of the valid data stored in that PU is increased (and/or the data volume of the invalid data stored in that PU is reduced). Otherwise, if the valid count corresponding to one PU is reduced, it means that the data volume of the valid data stored in that PU is reduced (and/or the data volume of the invalid data stored in that PU is increased). In addition, the recorded sorting information may be stored to the RNVM module 406 of FIG. 4 or the buffer memory 510 of FIG. 5.

The MMC 502 may dynamically update the valid count information corresponding to one PU according to the data storage status of that PU. For example, when the data volume of the valid data stored in one PU is increased (and/or the data volume of the invalid data stored in that PU is reduced), the MMC 502 may increase the valid count corresponding to that PU. Alternatively, when the data volume of the valid data stored in one PU is reduced (and/or the data volume of the invalid data stored in that PU is increased), the MMC 502 may reduce the valid count corresponding to that PU.

In an exemplary embodiment, the valid count corresponding to one PU reflects (or equals) a number of the physical programming units stored with the valid data in that PU. Alternatively, in another exemplary embodiment, the valid count corresponding to one PU reflects (or equals) a number of the physical programming units stored with the invalid data in that PU. Further, in another exemplary embodiment, the valid count may also indicate the data volume of the valid data or the invalid data by a data unit size of the other type, which is not particularly limited by the invention.

Figure 7:
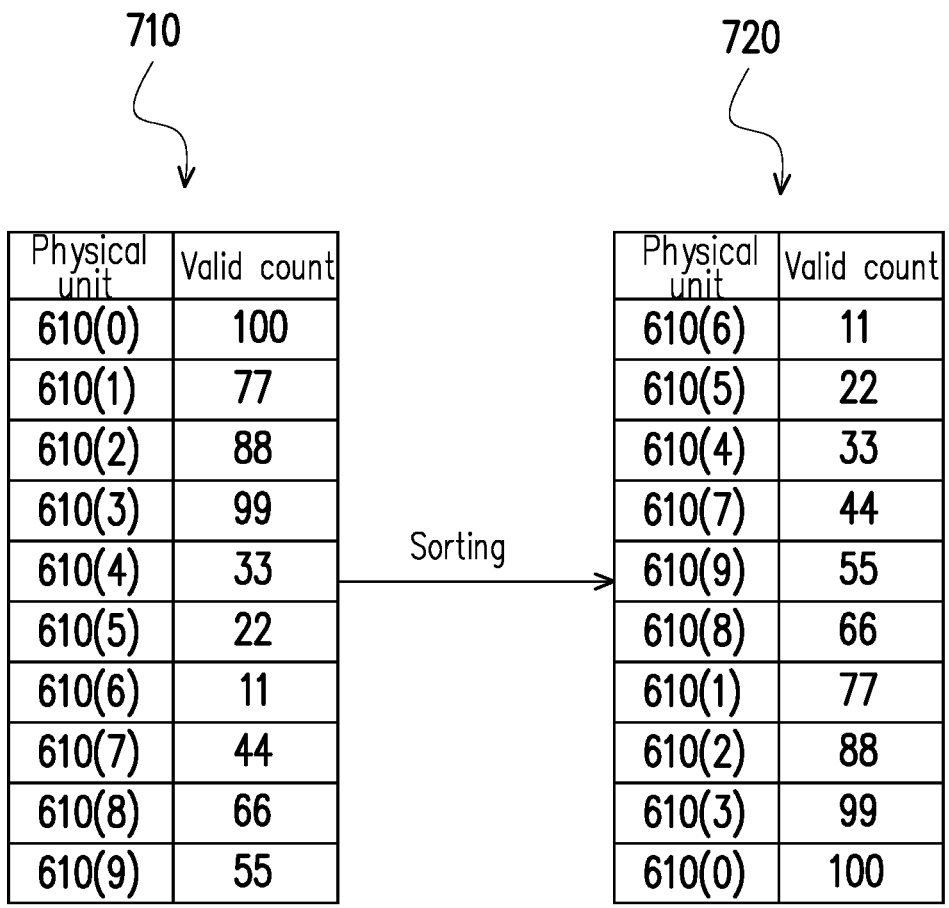
FIG. 7 illustrates a schematic diagram for sorting physical units according to an exemplary embodiment of the invention.

FIG. 7 illustrates a schematic diagram for sorting PUs according to an exemplary embodiment of the invention. With reference to FIG. 7, it is assumed that, at a certain time point, the valid counts corresponding to the PUs 610(0) to 610(9) are 100, 77, 88, 99, 33, 22, 11, 44, 66 and 55, respectively. However, sorting information 710 of the PUs 610(0) to 610(9) at the time does not reflect the data storage status of the PUs 610(0) to 610(9). Moreover, the PUs 610(0) to 610(9) are not sorted according to the respective valid counts at the time. In other words, the sorting information 710 does not reflect values of the valid counts corresponding to the PUs 610(0) to 610(9) (or the data volume of the valid data stored in the PUs 610(0) to 610(9)). The MMC 502 may sort the PUs 610(0) to 610(9) according to the data storage status of the PUs 610(0) to 610(9). For example, the MMC 502 may sort the PUs 610(0) to 610(9) according to the valid counts 11, 22, 33, 44, 55, 66, 77, 88, 99 and 100. A sorting status of the sorted PUs 610(0) to 610(9) may be indicated by sorting information 720. For example, the sorting information 720 may reflect the data volume of the valid data stored in the PU 610(6) being the least, the data volume of the valid data stored in the PU 610(5) being the second least, and the data volume of the valid data stored in the PU 610(0) being the most.

When the data merging operation is to be performed, the data merging operation may be performed according to the sorting information 720. For example, according to the sorting information 720, the PU 610(6) stored with the least valid data may have a highest priority for being selected as the source node of the valid data, and the PU 610(0) stored with the most valid data may have a lowest priority for being selected as the source node of the valid data. Accordingly, in the data merging operation, the valid data may be collected from the PUs 610(6), 610(5), 610(4), 610(7), 610(9), 610(8), 610(1), 610(2), 610(3) and 610(0) in that sequence according to the sorting information 720 and copied to at least one spare PU (a.k.a. a second PU). Further, in an exemplary embodiment, with other factors taken into consideration, the data merging operation may also adjust the priority of at least one PU for being used as the source node according to, for example, a data access frequency and/or a data storage time of the PUs 610(0) to 610(9).

On the other hand, the MMC 502 may receive commands from the host system 11. The commands of certain types may change the data storage status for part of the PUs. For example, the commands capable of changing the data storage status of the PUs include a trim command and an overwrite command. The trim command may be used to delete data to be deleted as instructed by the host system 11. According to the received trim command, the MMC 502 may mark data belonging to at least one LU in the RNVM module 406 as the invalid data. The overwrite command may give an instruction for overwriting (or updating) the data belonging to at least one LU. Therefore, according to the received overwrite command, the MMC 502 may also mark data belonging to at least one LU in the RNVM module 406 as the invalid data. If the data belonging to one LU is marked as the invalid data, the data volume of the valid data stored in the PU mapped to that LU is reduced. Further, the at least one command may also include a command for increasing the data volume of the valid data stored in the first PU.

In an exemplary embodiment, if the received commands can change the data storage status of the sorted first PUs, before the first PUs are re-sorted, the old sorting information of the first PUs is unable to reflect the latest data storage status of the first PUs. Therefore, before the first PUs are re-sorted, if the data merging operation is performed according to the old sorting information (i.e., the sorting information not being updated yet) for the first PUs, performance of the performed data merging operation may be reduced.

In an exemplary embodiment, the MMC 502 may update the sorting information corresponding to the first PUs according to the commands capable of changing the data storage status of the first PUs. In this way, the next data merging operation performed for the first PUs may be performed according to the latest data storage status of the first PUs.

Figure 8:
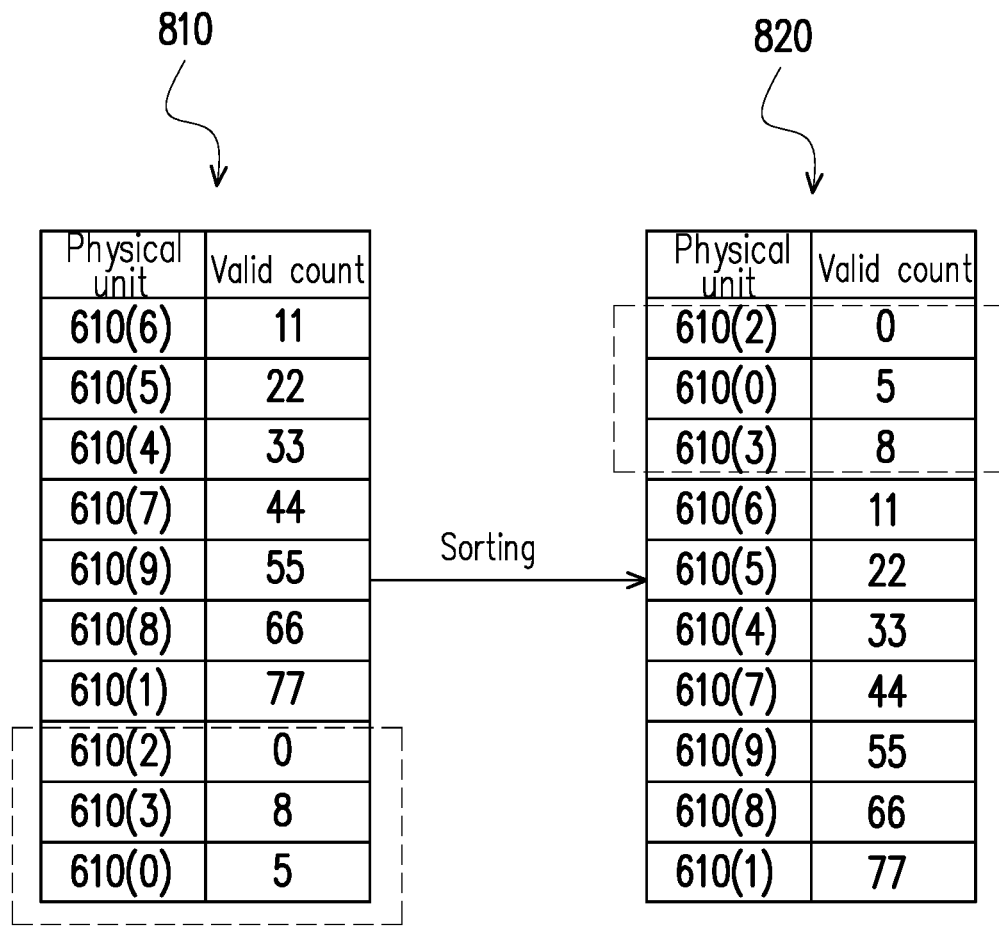
FIG. 8 illustrates a schematic diagram for sorting physical units according to another exemplary embodiment of the invention.

FIG. 8 illustrates a schematic diagram for sorting PUs according to another exemplary embodiment of the invention. With reference to FIG. 8, according to the received commands, the data volume of the valid data stored in the PUs 610(2), 610(3) and 610(0) are reduced, but sorting information 810 corresponding to the PUs 610(0) to 610(9)

is not updated yet. In other words, the sorting information 810 does not reflect the latest data storage status of the PUs 610(0) to 610(9).

In the present exemplary embodiment, according to the received commands, the latest data storage status of the PUs 610(0) to 610(9) may be used to re-sort the PUs 610(0) to 610(9). For example, after the PUs 610(0) to 610(9) are re-sorted, the sorting information 810 may be updated to sorting information 820. According to the sorting information 820, the three PUs 610(2), 610(0) and 610(3) stored with the least valid data are updated from those originally having the lowest priority for being selected as the source node of the valid data to those having the highest priority for being selected as the source node of the valid data. In this way, compared to the data merging operation performed according to the sorting information 810, the data merging operation performed according to the sorting information 820 may provide a higher performance.

In the data merging operation of an exemplary embodiment, the MMC 502 may select at least one PU matching a sorting condition from the PUs 610(0) to 610(9) according to the sorting information 820 and copy (the valid) data from the selected PU to the at least one second PU. It should be noted that, the valid count corresponding to the PU matching the sorting condition in the PUs 610(0) to 610(9) may not be greater than the valid count corresponding to another PU not matching the sorting condition in the PUs 610(0) to 610(9). For example, at the beginning of the data merging operation, the PU 610(2) may be regarded as the PU matching the sorting condition, and the rest of the PUs may be regarded as not matching the sorting condition. After the valid data is collected from the PU 610(2), the PU 610(0) may be regarded as the PU matching the sorting condition, and the rest of the PUs may be regarded as not matching the sorting condition. The same process is repeatedly performed until enough valid data is collected and/or the data merging operation is stopped. Alternatively, in another exemplary embodiment, at the beginning of the data merging operation, the PUs 610(2), 610(0) and 610(3) may be regarded as the PU matching the sorting condition, and the rest of the PUs may be regarded as not matching the sorting condition. After the valid data is collected from the PUs 610(2), 610(0) and 610(3), the PUs 610(6), 610(5) and 610(4) may be regarded as the PU matching the sorting condition, and the rest of the PUs may be regarded as not matching the sorting condition so the data merging operation can be carried out in succession. Further, in an exemplary embodiment, with other factors taken into consideration, the data merging operation may also adjust the priority of at least one PU for being used as the source node according to, for example, a data access frequency and/or a data storage time of the PUs 610(0) to 610(9), which are not particularly limited by the invention.

In an exemplary embodiment, in response to the received commands capable of changing the data storage status of the first PUs, an updating operation for the sorting information of the first PUs may be activated (triggered). In the updating operation for the sorting information of the first PUs, the first PUs may be automatically sorted and the sorting information corresponding to the first PUs may be automatically updated, as shown by FIG. 8. In an exemplary embodiment, the MMC 502 may determine whether the received commands are the trim command and/or the overwrite command. Once the trim command or the overwrite command is received, the MMC 502 may activate the operation of updating the sorting information corresponding to the first PUs. In other words, in an exemplary embodiment, the MMC 502 may determine whether to activate the operation of updating the sorting information corresponding to the first PUs according to the types of the commands from the host system 11.

In an exemplary embodiment, the MMC 502 may also set other conditions for activating the updating operation for the sorting information of the first PUs. In an exemplary embodiment, the MMC 502 may record LU information used as instructed by the received commands (e.g., the trim command and/or the overwrite command). If the LU info nation matches a predetermined condition, the MMC 502 may update the sorting information corresponding to the first PUs according to the data storage status of the first PU. Otherwise, if the LU information does not match the predetermined condition, the MMC 502 may not update the sorting information corresponding to the first PUs.

In an exemplary embodiment, the MMC 502 may determine whether a LU range corresponding to the LU information matches a predetermined range condition. If the LU range corresponding to the LU information matches the predetermined range condition, the MMC 502 may determine that the LU information matches the predetermined condition. Otherwise, if the LU range corresponding to the LU information does not match the predetermined range condition, the MMC 502 may determine that the LU information does not match the predetermined condition. For example, after receiving the trim command and/or the overwrite command, the MMC 502 may record a range of the LUs used as instructed by the commands (i.e., the LU range). For example, the LU range may be indicated by a number of the LUs, According to the commands, the data within the LU range may be marked as the invalid data. If the LU range exceeds a predetermined range, the MMC 502 may activate the updating operation for the sorting information of the first PUs. Otherwise, if the LU range does not exceed the predetermined range, the MMC 502 may not activate the updating operation for the sorting information of the first PUs.

Alternatively, from another perspective, if the data volume of the data in the first PU to be deleted or overwritten as instructed by the received commands is greater than a predetermined data volume, the MMC 502 may activate the updating operation for the sorting information of the first PUs. Otherwise, if the data volume of the data in the first PU to be deleted or overwritten as instructed by the received commands is not greater than the predetermined data volume, the MMC 502 may not activate the updating operation for the sorting information of the first PUs.

In an exemplary embodiment, if the data volume of the data in the first PU to be deleted or overwritten as instructed by the received commands (a.k.a. a logical data volume) occupies a proportion exceeding a predetermined proportion (e.g., 10%) of a total available logical capacity of the memory storage device 10, the memory storage device 502 may activate the updating operation for the sorting information of the first PUs. Otherwise, if the data volume of the data in the first PU to be deleted or overwritten as instructed by the received commands occupies a proportion not exceeding the predetermined proportion of the total available logical capacity of the memory storage device 10, the memory storage device 502 may not activate the updating operation for the sorting information of the first PUs. It should be noted that, the total available logical capacity of the memory storage device 10 may refer to a total logical capacity provided by the memory storage device 10 for the host system 11 to use.

In an exemplary embodiment, the MMC 502 may accumulate a number of the received commands (e.g., the trim command and/or the overwrite command). If such number matches a predetermined number, the MMC 502 may update the sorting information corresponding to the first PUs according to the data storage status of the first PU. Assuming that the predetermined number is 10, when 10 commands giving the instruction for deleting or overwriting the data stored in the first PUs are received, the MMC 502 may activate the updating operation for the sorting information of the first PUs. Otherwise, if only 9 commands giving the instruction for deleting or overwriting the data stored in the first PU are received, the MMC 502 may not activate the updating operation for the sorting information of the first PUs. In addition, each time after the sorting information corresponding to the first PUs is updated, previous accumulated information (e.g., the LU range or the number of the commands) may be reset.

In an exemplary embodiment, when the memory storage device 10 is powered up or turned on, the memory storage device 502 may automatically perform the updating operation for the sorting information of the first PUs once. Later, the memory storage device 10 may dynamically activate the updating operation for the sorting information of the first PUs according to the received commands (and/or variation in the data storage status of the first PUs). Operation details for updating the sorting information of the first PU have been specifically described above, which are not repeated hereinafter.

Figure 9:
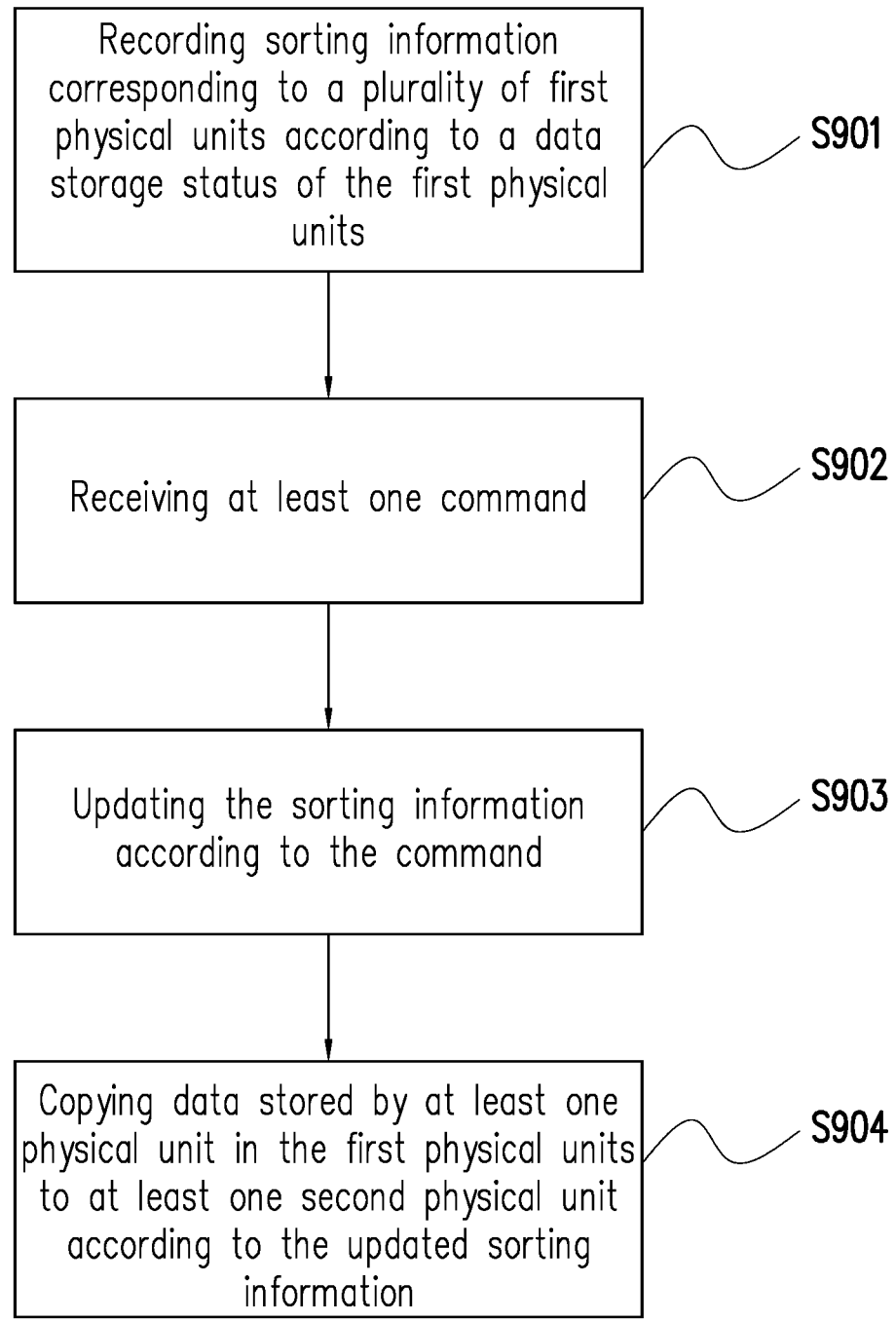
FIG. 9 is a flowchart illustrating a memory management method according to an exemplary embodiment of the invention.

FIG. 9 is a flowchart illustrating a memory management method according to an exemplary embodiment of the invention. With reference to FIG. 9, in step S901, sorting information corresponding to a plurality of first PUs is recorded according to a data storage status of the first PUs. In step S902, at least one command is received, and the at least one command is configured to change the data storage status of the first PUs. For example, the at least one command may include the trim command and/or the overwrite command, but not limited thereto. In step S903, the sorting information corresponding to the first PUs is updated according to the at least one command. For example, step S903 includes re-sorting the first PUs according to the data storage status of the first PUs so as to change the priority of at least one of the first PUs for being selected as the source node of the valid data in the data merging operation. In step 904, data (e.g., the valid data) stored in at least one PU in the first PUs is copied to at least one second PU according to the updated sorting information. For example, step S904 may include performing the data merging operation.

Figure 10:
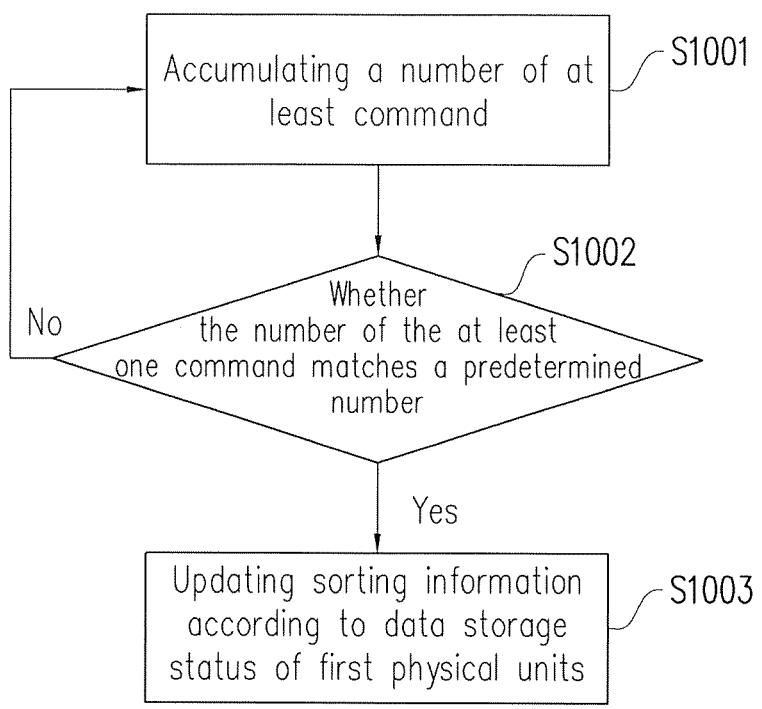
FIG. 10 to FIG. 11 are flowchart diagrams illustrating memory management methods according to some exemplary embodiments of the invention.
Figure 11:
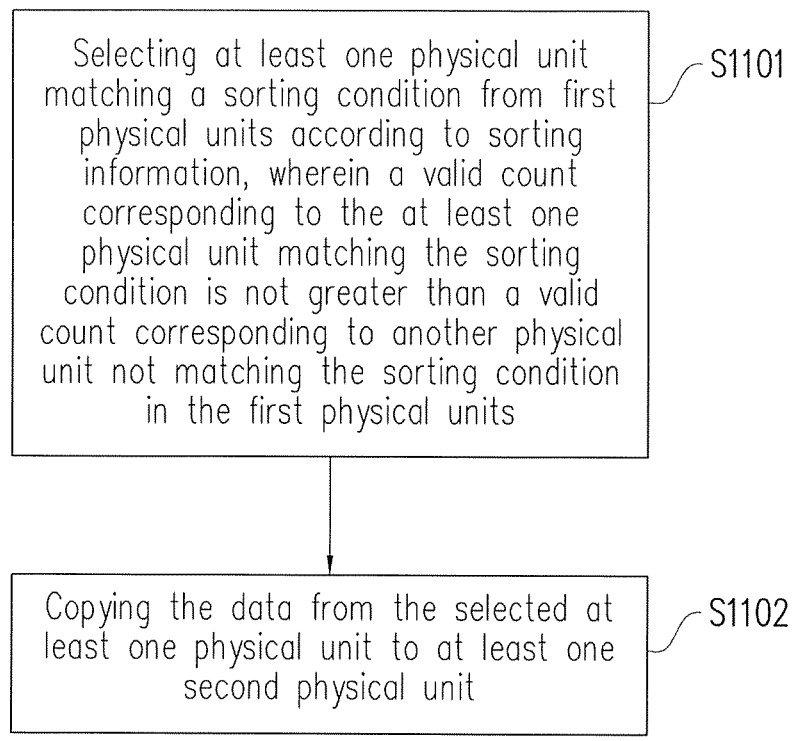

It should be noted that, steps depicted in FIG. 9 are described in detail as above so that related description thereof is omitted hereinafter. The steps depicted in FIG. 9 may be implemented as a plurality of program codes or circuits, which are not particularly limited by the invention. Moreover, the method disclosed in FIG. 9 may be implemented by reference with above exemplary embodiments, or may be implemented separately, which are not particularly limited in the invention. Referring to FIG. 10, a memory management method according to an exemplary embodiment is illustrated. In step S1001, a number of at least one command is accumulated. In step S1002, whether the number of the at least one command matches a predetermined number is determined. If the number of the at least one command does not match the predetermined number (step S1002, No), the memory management method goes back to perform the step S1001. If the number of the at least one command matches the predetermined number (step S1002, Yes), the memory management method goes to perform step S1003. In step S1003, sorting information is updated according to data storage status of first physical unit. Referring to FIG. 11, a memory management method according to an exemplary embodiment is illustrated. In step S1101, at least one physical unit matching a sorting condition is selected from the first physical units according to the sorting information. A valid count corresponding to the at least one physical unit matching the sorting condition is not greater than a valid count corresponding to another physical unit not matching the sorting condition in the first physical units. In step S1102, the data from the selected at least one physical unit is copied to the at least one second physical unit.

In summary, after the command capable of changing the data storage status of the first PUs (e.g., the trim command and/or the overwrite command) is received, the sorting information corresponding to the first PUs may be updated. The updated sorting information may be used in the data merging operation. Compared to the conventional approach in which the non-spare PUs needs to be re-sorted each time before the garbage collection operation is performed or the non-spare PUs are re-sorted only after the garbage collection operation is performed a predetermined number of times (e.g., 10 times), the invention can dynamically determine whether to update the sorting information corresponding to the PUs or not. As a result, performance of the data merging operation may be improved.

The previously described exemplary embodiments of the present disclosure have the advantages aforementioned, wherein the advantages aforementioned not required in all versions of the disclosure.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A memory management method for a rewritable non-volatile memory module, wherein the rewritable non-volatile memory module comprises a plurality of physical units, and the memory management method comprises:
   recording sorting information corresponding to a plurality of first physical units among the physical units according to a data storage status of the first physical units;
   receiving at least one command, wherein the at least one command is configured to change the data storage status of the first physical units;
   determining a receiving of the at least one command and activating an updating operation for the sorting information according to the receiving of the at least one command;
   not updating the sorting information in response to a preset condition being satisfied, wherein the preset condition comprises a first condition that a a total number of the received at least one command is not greater than a predetermined number, and the predetermined number is a positive integer; and
   copying data stored in at least one physical unit among the first physical units to at least one second physical unit among the physical units according to the updated sorting information.

2. The memory management method of claim 1, wherein the step of recording the sorting information according to the data storage status of the first physical units comprises:
   determining the sorting information according to valid count information corresponding to the first physical units.

3. The memory management method of claim 1, wherein the step of activating the updating operation for the sorting information according to the receiving of the at least one command comprises:
    recording logical unit information instructed to be used by the at least one command; and
    updating the sorting information according to the data storage status of the first physical units if the logical unit information matches a predetermined condition.

4. The memory management method of claim 3, further comprising:
    determining that the logical unit information matches the predetermined condition if a logical unit range corresponding to the logical unit information matches a predetermined range condition.

5. The memory management method of claim 1, wherein the step of activating the updating operation for the sorting information according to the at least one command comprises:
    accumulating a number of the at least one command; and
    updating the sorting information according to the data storage status of the first physical units if the number of the at least one command matches the predetermined number.

6. The memory management method of claim 1, further comprising:
    marking data belonging to a logical unit as invalid data according to the at least one command, wherein the logical unit is mapped to one of the first physical units.

7. The memory management method of claim 1, wherein the step of copying the data stored in the at least one physical unit among the first physical units to the at least one second physical unit among the physical units according to the updated sorting information comprises:
    selecting the at least one physical unit from the first physical units according to the sorting information, wherein a valid count corresponding to the at least one physical unit is not greater than a valid count corresponding to another physical unit in the first physical units; and
    copying the data from the selected at least one physical unit to the at least one second physical unit.

8. A memory storage device, comprising:
    a connection interface unit, configured to couple to a host system;
    a rewritable non-volatile memory module, wherein the rewritable non-volatile memory module comprises a plurality of physical units; and
    a memory control circuit unit, coupled to the connection interface unit and the rewritable non-volatile memory module,
    wherein the memory control circuit unit is configured to record sorting information corresponding to a plurality of first physical units among the physical units according to a data storage status of the first physical units,
    wherein the memory control circuit unit is further configured to receive at least one command, and the at least one command is configured to change the data storage status of the first physical units,
    wherein the memory control circuit unit is further configured to determine a receiving of the at least one command and activate an updating operation for the sorting information according to the receiving of the at least one command,
    wherein the memory control circuit unit is further configured not to update the sorting information in response to a preset condition being satisfied, wherein the preset condition comprises a first condition that a total number of the received at least one command is not greater than a predetermined number, and the predetermined number is a positive integer,
    wherein the memory control circuit unit is further configured to copy data stored in at least one physical unit among the first physical units to at least one second physical unit among the physical units according to the updated sorting information.

9. The memory storage device of claim 8, wherein the operation of recording the sorting information according to the data storage status of the first physical units by the memory control circuit unit comprises:
    determining the sorting information according to valid count information corresponding to the first physical units.

10. The memory storage device of claim 8, wherein the operation of activating the updating operation for the sorting information according to the receiving of the at least one command by the memory control circuit unit comprises:
    recording logical unit information instructed to be used by the at least one command; and
    updating the sorting information according to the data storage status of the first physical units if the logical unit information matches a predetermined condition.

11. The memory storage device of claim 10, wherein the memory control circuit unit is further configured to determine that the logical unit info nation matches the predetermined condition if a logical unit range corresponding to the logical unit information matches a predetermined range condition.

12. The memory storage device of claim 8, wherein the operation of activating the updating operation for the sorting information according to the at least one command by the memory control circuit unit comprises:
    accumulating a number of the at least one command; and
    updating the sorting information according to the data storage status of the first physical units if the number of the at least one command matches the predetermined number.

13. The memory storage device of claim 8, wherein the memory control circuit unit is further configured to mark data belonging to a logical unit as invalid data according to the at least one command, and the logical unit is mapped to one of the first physical units.

14. The memory storage device of claim 8, wherein the operation of copying the data stored in the at least one physical unit among the first physical units to the at least one second physical unit among the physical units according to the updated sorting information by the memory control circuit unit comprises:
    selecting the at least one physical unit from the first physical units according to the sorting information, wherein a valid count corresponding to the at least one physical unit is not greater than a valid count corresponding to another physical unit in the first physical units; and
    copying the data from the selected at least one physical unit to the at least one second physical unit.

15. A memory control circuit unit for controlling a memory storage device, wherein the memory control circuit unit comprises:
    a host interface, configured to couple to a host system;
    a memory interface, configured to couple to a rewritable non-volatile memory module, wherein the rewritable non-volatile memory module comprises a plurality of physical units; and a memory management circuit, coupled to the host interface and the memory interface, wherein the memory management circuit is configured to record sorting information corresponding to a plurality of first physical units among the physical units according to a data storage status of the first physical units, wherein the memory management circuit is further configured to receive at least one command, and the at least one command is configured to change the data storage status of the first physical units, wherein the memory management circuit is further configured to determine a receiving of the at least one command and activate an updating operation for the sorting information according to the receiving of the at least one command, wherein the memory management circuit is further configured not to update the sorting information in response to a preset condition being satisfied, wherein the preset condition comprises a first condition that a total number of the received at least one command is not greater than a predetermined number, and the predetermined number is a positive integer, wherein the memory management circuit is further configured to copy data stored in at least one physical unit among the first physical units to at least one second physical unit among the physical units according to the updated sorting information.

16. The memory control circuit unit of claim 15, wherein the operation of recording the sorting information according to the data storage status of the first physical units by the memory management circuit comprises:

determining the sorting information according to valid count information corresponding to the first physical units.

17. The memory control circuit unit of claim 15, wherein the operation of activating the updating operation for the sorting information according to the at least one command by the memory management circuit unit comprises:

recording logical unit information instructed to be used by the at least one command; and updating the sorting information according to the data storage status of the first physical units if the logical unit information matches a predetermined condition.

18. The memory control circuit unit of claim 17, wherein the memory management circuit is further configured to determine that the logical unit information matches the predetermined condition if a logical unit range corresponding to the logical unit information matches a predetermined range condition.

19. The memory control circuit unit of claim 15, wherein the operation of activating the updating operation for the sorting information according to the at least one command by the memory management circuit unit comprises:

accumulating a number of the at least one command; and updating the sorting information according to the data storage status of the first physical units if the number of the at least one command matches the predetermined number.

20. The memory control circuit unit of claim 15, wherein the memory management circuit is further configured to mark data belonging to a logical unit as invalid data according to the at least one command, and the logical unit is mapped to one of the first physical units.

21. The memory control circuit unit of claim 15, wherein the operation of copying the data stored in the at least one physical unit among the first physical units to the at least one second physical unit among the physical units according to the updated sorting information by the memory management circuit comprises:

selecting the at least one physical unit from the first physical units according to the sorting information, wherein a valid count corresponding to the at least one physical unit is not greater than a valid count corresponding to another physical unit in the first physical units; and copying the data from the selected at least one physical unit to the at least one second physical unit.

* * * * *